(12) United States Patent
Seki et al.

(10) Patent No.: US 7,236,968 B2
(45) Date of Patent: Jun. 26, 2007

(54) QUESTION-ANSWERING METHOD AND QUESTION-ANSWERING APPARATUS

(75) Inventors: Minenobu Seki, Kokubunji (JP); Katsumi Marukawa, Sagamiko (JP); Masanobu Takatsu, Ichikawa (JP)

(73) Assignee: Hitachi, Ltd., Tokyo (JP)

( * ) Notice: Subject to any disclaimer, the term of this patent is extended or adjusted under 35 U.S.C. 154(b) by 486 days.

(21) Appl. No.: 10/766,183

(22) Filed: Jan. 29, 2004

(65) Prior Publication Data
US 2005/0060301 A1 Mar. 17, 2005

(30) Foreign Application Priority Data
Sep. 12, 2003 (JP) ............................ 2003-320602

(51) Int. Cl.
*G06F 7/00* (2006.01)
(52) U.S. Cl. .............................................. 707/1; 707/3
(58) Field of Classification Search ................ 707/1–6, 707/9
See application file for complete search history.

(56) References Cited

U.S. PATENT DOCUMENTS 6,718,368 B1 * 4/2004 Ayyadurai ..................... 707/1
6,766,320 B1 * 7/2004 Wang et al. .................... 707/5
6,879,979 B2 * 4/2005 Hindawi et al. ............... 707/3
6,910,003 B1 * 6/2005 Arnold et al. .................. 704/4
6,970,908 B1 * 11/2005 Larky et al. ................ 709/206

* cited by examiner

*Primary Examiner*—Wilson Lee
(74) *Attorney, Agent, or Firm*—Reed Smith LLP; Stanley P. Fisher, Esq.; Juan Carlos A. Marquez, Esq.

(57) ABSTRACT

A question document is divided into predetermined areas, and it is judged whether each divided area is important, to thereby extract an important area. A reply example candidate likelihood value is calculated for each important area, the likelihood value indicating the degree representative of whether each reply example candidate corresponds to a question content. By using the reply example candidate likelihood value, important areas having similar meanings are combined to extract final important parts. A reply example candidate is selected for each important part from reply example candidates prepared beforehand. A reply example candidate reliability degree representative of certainty of each reply example candidate and a reply composition degree indicating whether it is necessary to compose a new reply are calculated, and by using these values, question documents are distributed to different operator terminals.

16 Claims, 17 Drawing Sheets

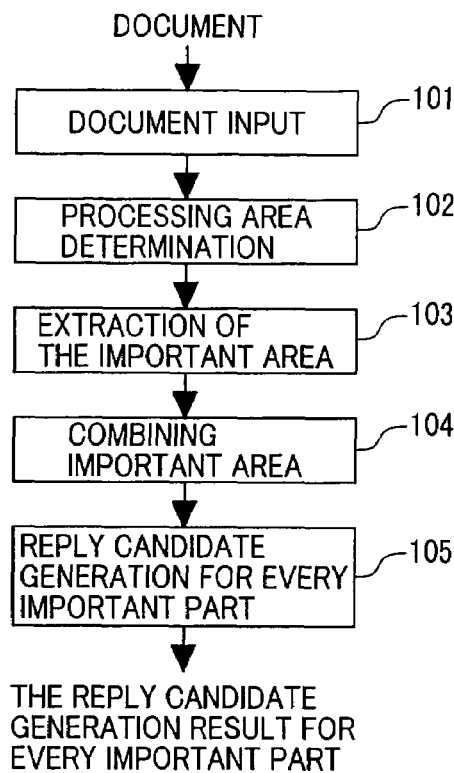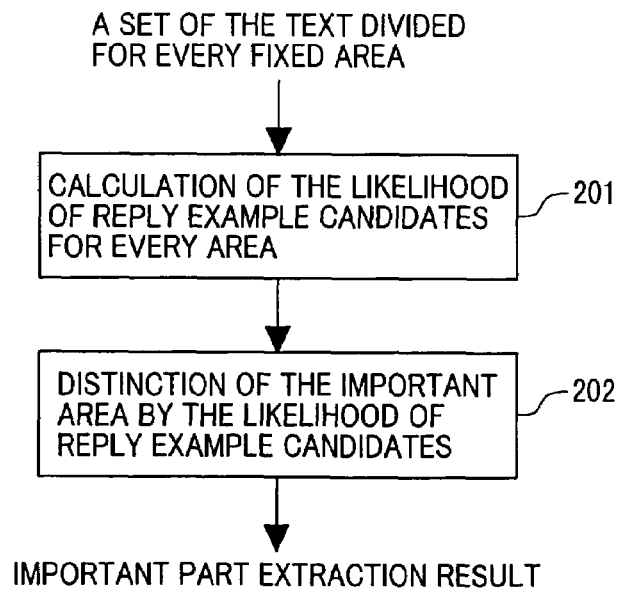

QUESTION-ANSWERING METHOD AND QUESTION-ANSWERING APPARATUS

BACKGROUND OF THE INVENTION

1. Field of the Invention

The present invention relates to an automatic answering method and apparatus for supporting a question reply process of replying to a question document of a text format.

2. Description of the Related Art

With recent widespread of computerization, questions to companies or the like are often made by form inputs at home pages or e-mails. If every question is to be answered manually on the company side, many operators are required and the cost increases. A novice operator can not answer some questions or it takes a long time for the novice operator to answer a question. In order to solve this problem, a question-answering system has been introduced recently. With this system, a question document is input and its content is analyzed to select a reply example candidate from reply examples and question-reply examples prepared for each question content and to present the selected reply example candidate.

Most of such question-answering systems assume, however, that one document contains only one consultation content. Therefore, if a plurality of question contents are written in one document, the systems cannot analyze each question content, resulting in a low reply precision.

Another technique is disclosed in JP-A-2002-132661. This technique discloses means for dividing one document containing a plurality of question contents, into each question content. The divided question content is analyzed to select a reply example candidate. A reply precision representative of a likelihood or degree of each reply example candidate for the question content is calculated. If the reply precision has a predetermined value or higher, an answer is formed from the reply example candidate, whereas if the reply precision is lower than the predetermined value, an instruction is given to compose a new answer.

The conventional technique disclosed in JP-A-2002-132661 describes that the means for dividing a document into each question content performs a division process by using "number", "alphabet", ".", an indent, a conjunction such as "or", and the like. However, if a document is divided into each question content by using "number", an indent and the like as a separator, there occurs the problem that one question content is divided into a plurality of sentences. Conversely, there arises the problem that if the range of a question content is broad, example candidates for a plurality of question contents cannot be selected.

According to conventional techniques, since a question document is divided basing upon only the information about the contents of the question document, the divided range may not be covered by each reply example candidate. Namely, it is necessary to divide a question document so as to be covered by a prepared reply example candidate, and not to divide it by referring only to the question document content.

Since a question document divided basing upon conventional techniques may be a document irrelevant to the question document content, the reply example candidate generation process is adversely affected so that the reply example candidate generation precision lowers. It also takes a time for a reply composition operator to find a proper document to be read.

According to conventional techniques, a reply precision representative of the likelihood value of a reply example candidate is calculated, and if the reply precision is a predetermined value or higher, a reply is generated from the reply example candidate to automatically answer (automatically return) the question. If the reply precision is lower than the predetermined value, an instruction is given to compose a new answer. However, if there are a large number of types of replies or if a similar question requires a different answer, the reply precision lowers so that the number of samples exceeding a predetermined threshold reduces. Therefore, the number of samples capable of being used for the automatic reply reduces, and the number of cases requiring to generate new answers increases. There arises the problem of a low operator work efficiency or an automatic reply using an erroneous reply example candidate.

SUMMARY OF THE INVENTION

The present invention has been made to solve the above-described problems and aims to provide a question-answering method and apparatus capable of selecting a reply example candidate for each question at a high precision even if one question document contains a plurality of question contents.

It is another object of the present invention to provide a question-answering apparatus capable of presenting an important area of a question document to an operator to make the operator read only a necessary area.

It is still another object of the present invention to provide an automatic question-answering method and apparatus capable of improving the efficiency of an operator work without automatically replying by using an erroneous reply example, even if there are a large number of types of replies or even if a similar question requires a different answer.

In order to solve the above-described problems, a plurality of reply examples are prepared beforehand, and when a question document is input, important parts areas are extracted from the question document for each question content, and reply example candidates are selected from reply example candidates prepared for each important part.

Since reply example candidates are generated by using only the important parts and excluding parts irrelevant to each question content, a selection precision of a reply example candidate can be improved even if there are a plurality of question contents. An important part is extracted by dividing a question document into predetermined areas, and each divided area is checked whether it contains an important part. The reply example candidate likelihood value for each extracted area is calculated, the likelihood value indicating the degree that the sentence in each area corresponds to the question content to each reply example. By using the reply example candidate likelihood value, important areas having similar meanings are combined to extract final important parts.

A plurality of important parts are extracted collectively from a document so at to match reply example candidates prepared beforehand, so that a selection precision of reply example candidates for each question content can be improved.

An important area is extracted in accordance with the degree that the area corresponds to the question content relevant to the reply example and the degree that the area corresponds to the important part of the question content, or in accordance to the higher degree of both the degrees. A question document set collected before hand is classified into each reply example to form a database, and occurrence frequency information of a predetermined keyword (reply example keyword frequency information) is calculated for each reply example. Databases are generated for important and unimportant parts to form an important database and an unimportant database. Occurrence frequency information of a predetermined keyword for each of the important and unimportant databases (important part keyword frequency information and unimportant part keyword frequency information) is formed to judge whether each area is important by using these pieces of the frequency information.

In addition to the above-described method of selecting a reply example candidate, a reply example candidate reliability degree of each reply example candidate for the important part is calculated, the reliability degree indicating the degree of certainty of a reply example candidate to thereby judge whether each reply example candidate is correct and can be selected, and a reply new composition degree is calculated indicating the degree representative of whether a new reply is required to be composed to thereby judge whether it is necessary to compose a new reply. Question documents are distributed to different operator terminals, depending upon the case that the reply example candidates for all important parts are judged correct, the case that a new reply is required to be composed for one or more important parts, and other cases.

In this manner, the document, for which it is judged that reply example candidates for all important parts are correct and can be selected, is sent directly to a supervisor terminal. The supervisor terminal received this document performs only a work (reply confirmation work) of confirming whether these reply example candidates are correct, and if it is confirmed that the reply example candidates are correct for all reply contents, the selected reply examples are sent back to the questioner. A specific knowledge operator terminal, received a question document for which it is judged that a new reply is required to be composed for one or more important parts, as well as the reply example candidates for the question document, performs a reply new composition work for the important part for which it is judged that a new reply is required to be composed, and selects a reply from one or more reply example candidates for each of other important parts, to thereafter send the replies to the supervisor terminal. A general operator terminal, received a document other than the above-described two types of documents and its reply example candidates, selects a reply from one or more reply example candidates for each important part, to thereby compose a reply and send it to the supervisor terminal.

Conventionally, a reply selection work or a reply new composition work has been required to be performed for each important part of all documents. In this embodiment, however, a document sent directly to the supervisor terminal is subjected to only the confirmation work for reply example candidates so that the work can be made efficient. Since the number of operators is reduced, the cost can be lowered. A general operator performs a reply composition work for the question document including only a reply example candidate selection work, and a specific knowledge operator performs a reply new composition work for the question document for which a new reply is required to be composed, so that the work can be made efficient. The number of specific knowledge operators receiving generally high wages can be reduced so that the cost can be lowered.

BRIEF DESCRIPTION OF THE DRAWINGS

FIG. 1 is a diagram illustrating a process of dealing with a plurality of consultations through important area extraction.

FIG. 2 is a diagram illustrating an important area extraction process utilizing a reply example candidate likelihood value.

DESCRIPTION OF THE EMBODIMENTS

In a first embodiment, the fundamental structure of the present invention to be reduced in practice will be described, and in a second embodiment, the fundamental structure added with automatic distribution to operators will be described.

First Embodiment

Figure 5:
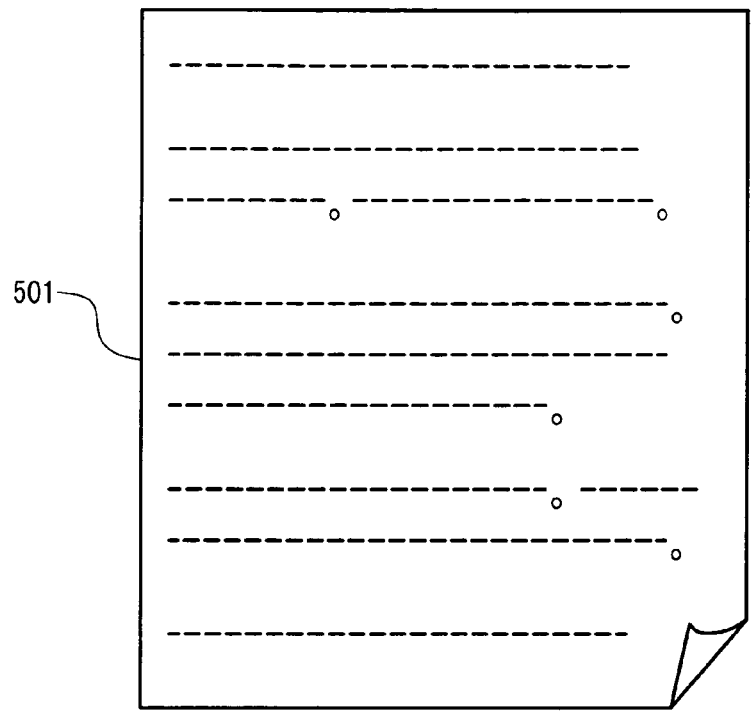
FIG. 5 is a diagram showing an example of an input document.
Figure 6:
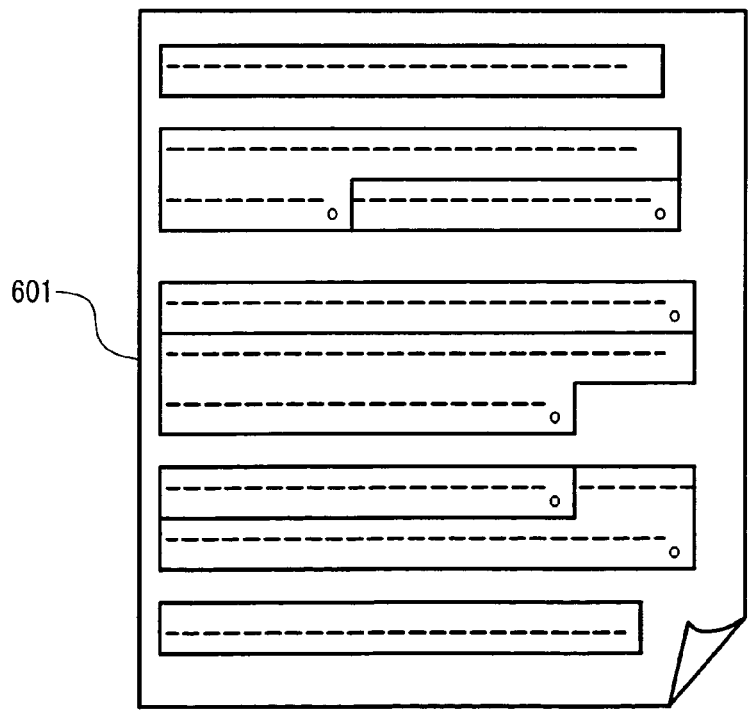
FIG. 6 is a diagram illustrating area setting by using periods and/or new paragraphs as a separator.

The present invention will be described with reference to the accompanying drawing. FIG. 1 is a diagram showing the fundamental structure of the present invention. At a document input step 101, a document of a text format is input. This text document may be an e-mail, a document read from a paper document with an OCR equipment, or the like. FIG. 5 shows an example of a text document whose contents are represented by (-) excepting periods.

Important parts for respective question contents are extracted from an input document.

First, a processing area determination step 102 is executed for an input document. The document is divided by using new paragraphs and periods as separators. FIG. 5 shows an example of a divided document.

Next, an important area extraction step 103 is executed. The sentence in each area divided by the processing area determination step 102 is checked whether it is important or unimportant, in accordance with question document sets for respective reply examples and corresponding reply example keyword frequency information (e.g., 1104, 1105, 1106) shown in FIG. 11, and important area sets and unimportant area sets and corresponding important part keyword frequency information (1201) and unimportant part keyword frequency information (1202) shown in FIG. 12.

Figure 11:
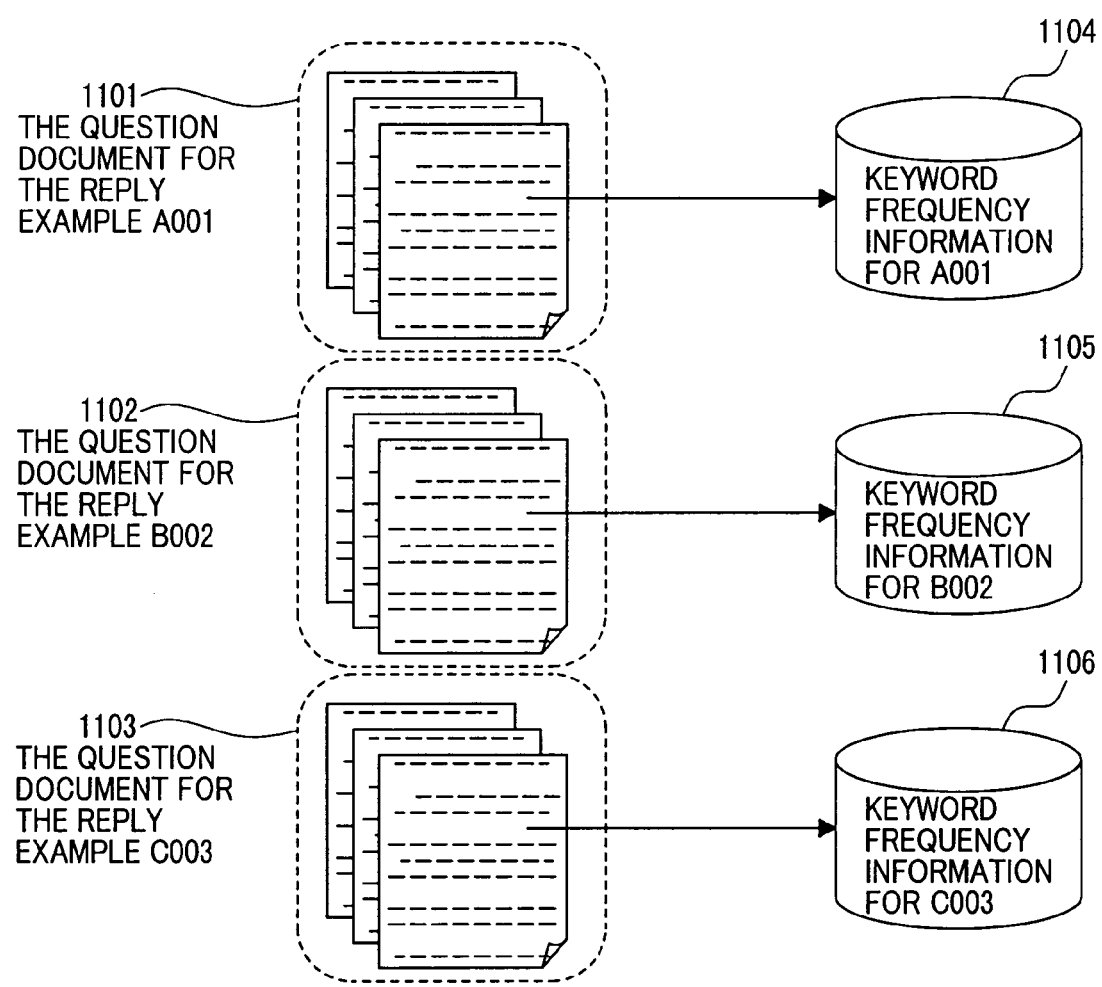
FIG. 11 is a diagram showing reply example keyword frequency information to be used at a reply candidate generation step.

With reference to FIG. 11, description will be made on a method of generating keyword frequency information for each reply example. In this example, although three reply examples are used, several hundred reply examples are generally used. In the following description, these three reply examples will be used by way of example. First, a plurality of question sample documents are classified into each corresponding reply example. If one sample document requires a plurality of reply examples, the sample document is worked and separated so that one reply example can deal with each separated document. Separated documents are classified into each corresponding reply example. For each classified document set, i.e., for each reply example, frequency information of predetermined L keywords ($W_1$, $W_2$, . . . , $W_L$) is composed. The keyword frequency information is ($A001Wc_1$, $A001Wc_2$, . . . , $A001Wc_L$) for the reply example A001, ($B002Wc_1$, $B002Wc_2$, . . . , $B002Wc_L$) for the reply example B002, and ($C003Wc_1$, $C003Wc_2$, . . . , $C003Wc_L$) for the reply example C003.

Figure 12:
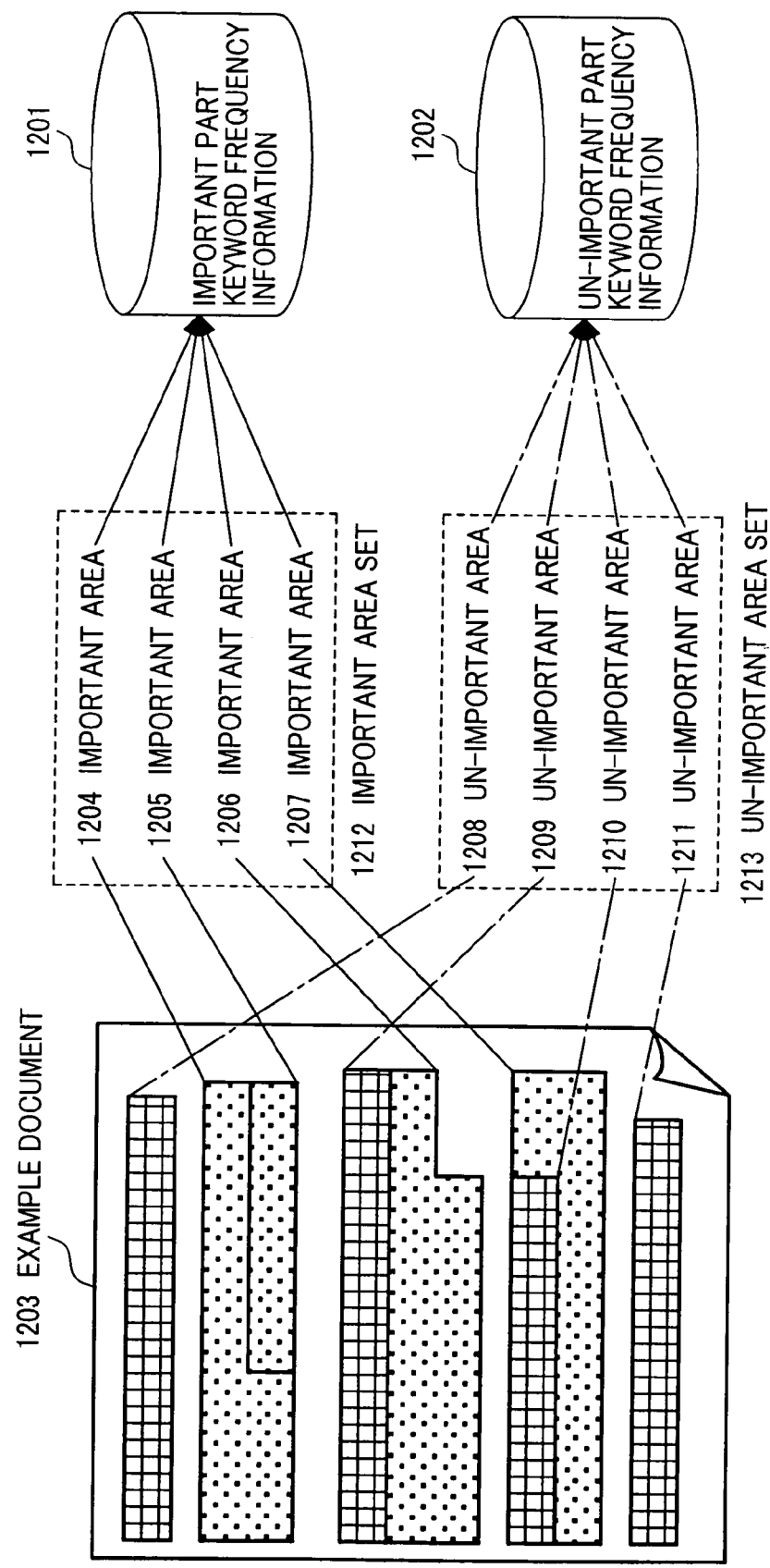
FIG. 12 is a diagram showing important/unimportant part keyword frequency information to be used at an important part distinction step.

Next, with reference to FIG. 12, description will be made on a method of generating important part keyword frequency information and unimportant part keyword frequency information. First, a plurality of sample documents are divided into important areas and unimportant areas (an important area set 1212 and an unimportant area set 1213). Frequency information of the predetermined L keywords ($W_1$, $W_2$, . . . , $W_L$) in each of the important area set and unimportant area set is generated. Keyword information is ($IWc_1$, $IWc_2$, . . . , $IWc_L$) for the important part and ($UWc_1$, $UWc_2$, . . . , $UWc_L$) for the unimportant part. The keyword frequency information is the number of occurrence frequencies of each predetermined keyword in the document set. For example, the keyword frequency information ($A001Wc_1$, $A001Wc_2$, . . . , $A001Wc_L$) indicates the numbers of frequencies of the keywords appeared in the question document set corresponding to the reply example A001. The keyword frequency information is not limited only to the number of occurrence frequencies of each keyword, but it may be an index which can indicate an occurrence tendency of each keyword in a question document set. The keywords ($W_1$, $W_2$, . . . , $W_L$) are not limited to words, but they may be factors characteristic to a document, such as a single character, a pair of words appearing in one sentence.

Each piece of the keyword frequency information has been described above. Description will be made on a method of extracting important areas by using the keyword frequency information.

The important area is extracted from each processing area divided at the processing area determination step 102. First, the numbers of frequencies of the predetermined keywords ($W_1$, $W_2$, . . . , $W_L$) in each processing area are counted as ($PW_1$, $PW_2$, . . . , $PW_L$). At a calculation step 401 of calculating a reply example candidate importance degree in each area, an area reply example importance degree ($A001LhdIU$, $B002LhdIU$, $C003LhdIU$) is calculated for respective reply examples. The area reply example candidate importance degree is calculated for respective reply examples by using the following formulas (1). The calculation method is not limited to the formulas (1), but other formulas may also be used if they can indicate the degree that the sentence in each area corresponds to the question content for each reply example, the degree that the sentence corresponds to the important content as the question content, or the degree that the sentence in each area corresponds to the question content for each reply example and to the important content as the question content. For example, the formulas may be used which do not use any one piece of the important part keyword frequency information, unimportant part keyword frequency information and reply example keyword frequency information. Another method utilizes IDF (Inverse Document Frequency) calculation, as described in "Information Retrieval Algorithm" by kenji KITA, Kazuhiko TSUDA and Masanori SHISHIBORI, KYORITSU SHUPPAN Co. Ltd. The formulas (1) take larger values as the important area possibility becomes higher. Conversely, some formulas take smaller values as the important area possibility becomes higher.

$$A001LhdIU = \sum_{i=1}^{L} PW_i \times A001W_{Ci} \times IW_{Ci} / UW_{Ci} \quad (1)$$

$$B002LhdIU = \sum_{i=1}^{L} PW_i \times B002W_{Ci} \times IW_{Ci} / UW_{Ci}$$

$$C003LhdIU = \sum_{i=1}^{L} PW_i \times C003W_{Ci} \times IW_{Ci} / UW_{Ci}$$

After the formulas (1) are calculated, the reply examples are sorted in the higher order of the reply example candidate importance degree.

At a step 402 of distinguishing an important area by the reply example candidate importance degree, the area reply example importance degree is compared for each area with a threshold value predetermined for each category. If one or more reply examples have the importance degree equal to or larger than the threshold value, this area is extracted as the important area. If the formulas, which take smaller values as the important area possibility becomes higher, are used, the area reply example candidate importance degree is compared with a threshold value predetermined for each category, and if one or more reply examples have the importance degree equal to or smaller than the threshold value, this area is extracted as the important area.

Figure 7:
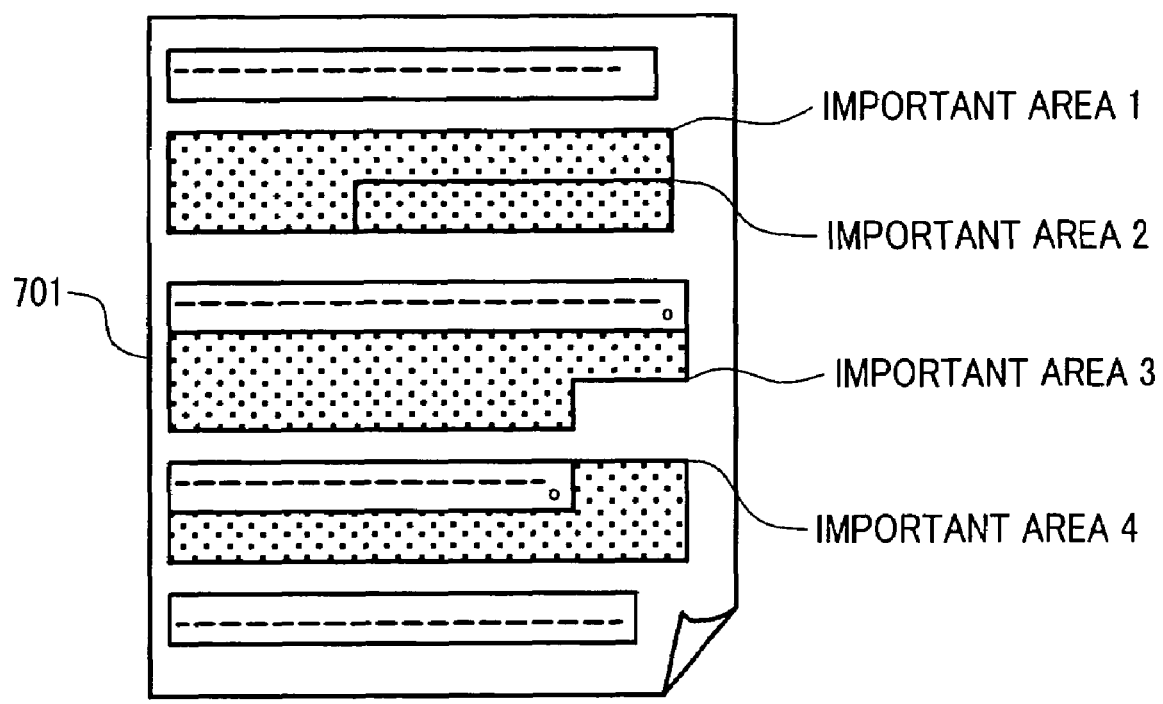
FIG. 7 is a diagram showing an example of extracted important areas.
Figure 8:
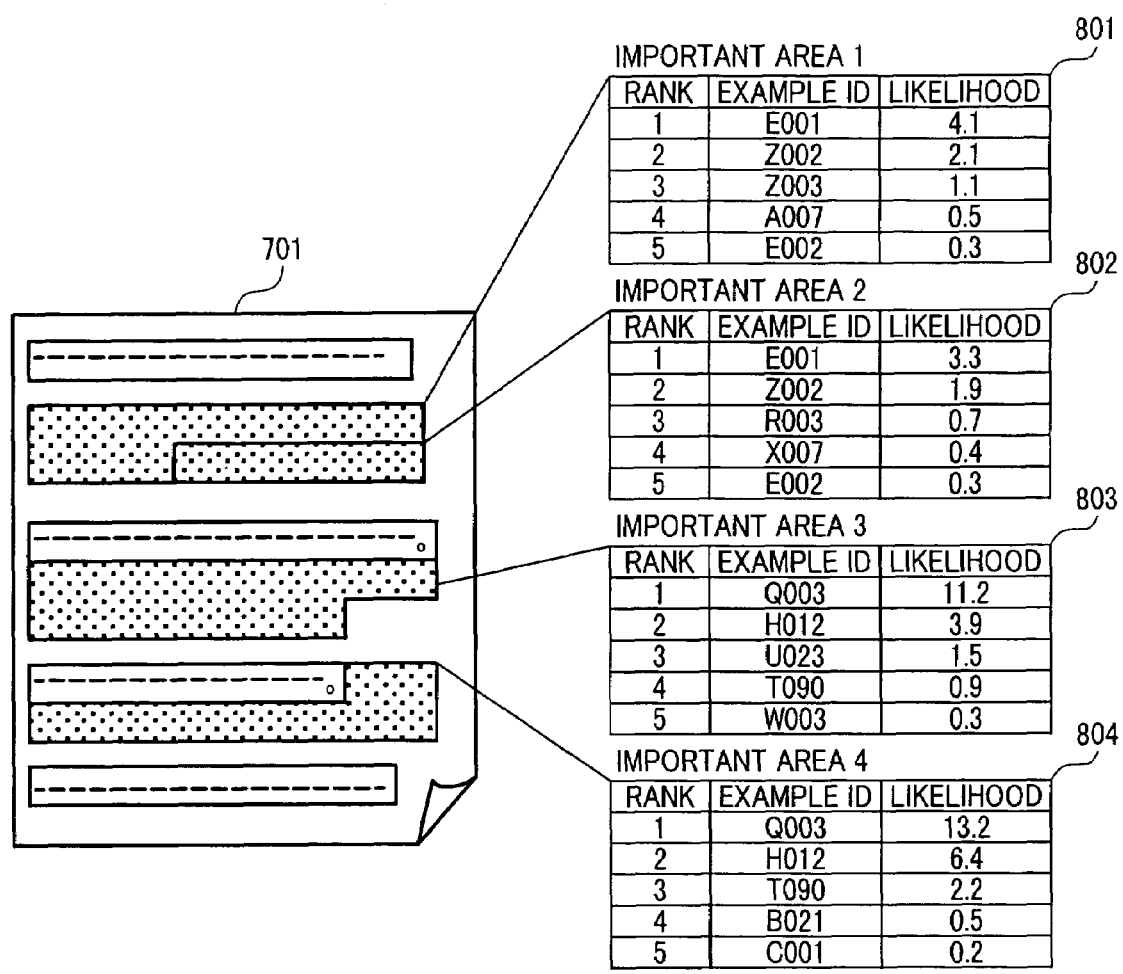
FIG. 8 is a diagram illustrating the generation of reply example candidates for each important area.
Figure 9:
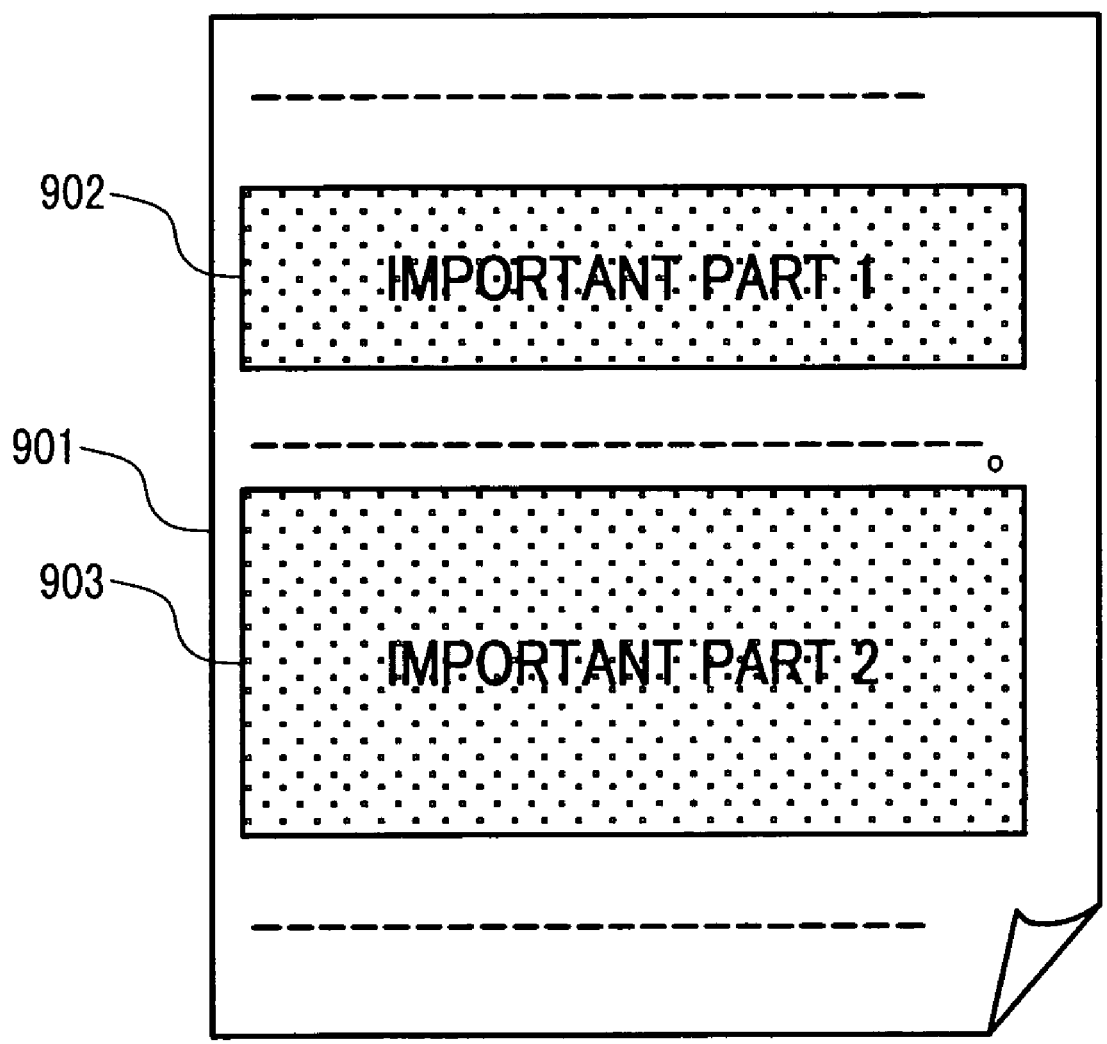
FIG. 9 is a diagram showing the result of combination of important areas.
Figure 10:
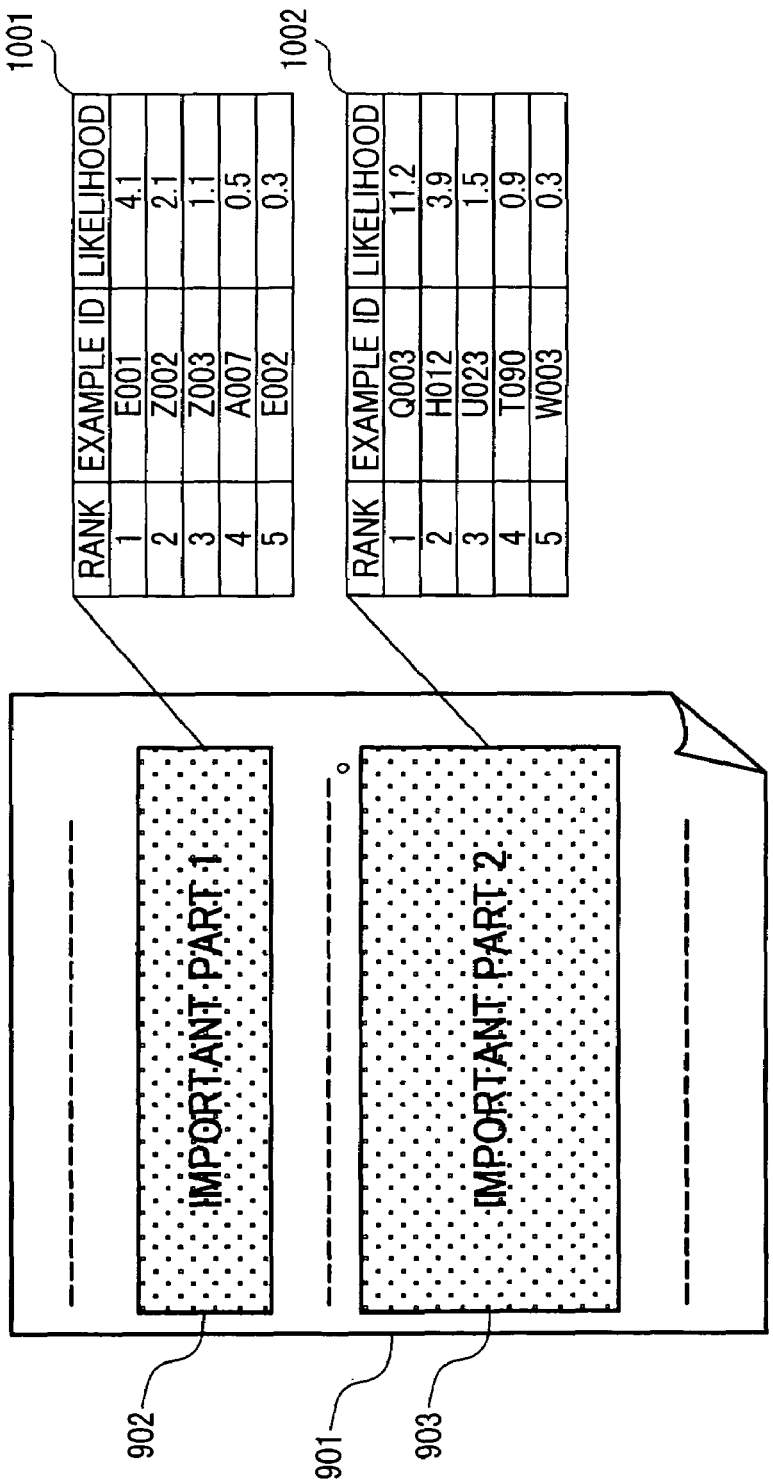
FIG. 10 is a diagram showing the result of generation of reply example candidates through important part extraction.

FIG. 7 shows a display example. The dot meshing area is an important area. The above-described important area extraction method is one example. The area to be determined at the processing area determination step 102 may have a fixed number of characters or the input document may be divided by a predetermined keyword.

As described above, a characteristic area of a question document corresponding to each reply example can be extracted by using the reply example keyword frequency information. An important area in a question document can be extracted by using the important part keyword frequency information. Extraction of an unimportant area can be suppressed, namely the extraction precision of an important area can be improved, by using the unimportant part keyword frequency information. As above, by using the reply example keyword frequency information, important part keyword frequency information and unimportant part keyword frequency information, an important area can be extracted from a sentence which contains a fixed keyword or expression. An important area can be extracted at a higher precision by the combination of such information.

Next, an important area combination step 104 is executed. At this step, a plurality of extracted important areas which use the same reply example, i.e., have the same question content, are combined.

First, an area reply example candidate likelihood value (A001Lhd, B002Lhd, C003Lhd) is calculated for each reply example and for each important area. The area reply example candidate likelihood value is calculated for each reply example by the following formulas (2). The calculation method is not limited only to the formulas (2), but other formulas may also be used if they can indicate the degree representative of whether the sentence in each area has the question content corresponding to each reply example. For example, the values used for extracting the important area may be used as the likelihood value.

$$A001LhdIU = \sum_{i=1}^{L} PW_i \times A001W_{Ci} \qquad (2)$$

$$B002LhdIU = \sum_{i=1}^{L} PW_i \times B002W_{Ci}$$

$$C003LhdIU = \sum_{i=1}^{L} PW_i \times C003W_{Ci}$$

The reply examples are sorted in the higher order of the reply example candidate likelihood value. Important areas corresponding to the same reply example candidate having the highest reply example candidate likelihood value are combined to extract an important part. The reply example candidate likelihood value is again calculated for the combined areas. These areas are processed in the higher order of the reply example candidate likelihood value. If there are important areas corresponding to the same reply example candidate having the highest reply example candidate likelihood value, these areas are combined. This process is repeated until there are no important areas having the same first rank reply example candidate. The combination process may be performed by incorporating the second and third rank reply example candidates. If the start of an important area begins with a keyword receiving a previous sentence such as "therefore" and "that" and if there is an adjacent previous important area, this area may be combined to the next important area.

An example of the important area extraction process has been described above. By combining important areas corresponding to the same reply example candidate to collect important parts, it becomes possible to divide a question content into a plurality of question contents or conversely to prevent an area covering a plurality of question contents from being extracted. If a question content is relatively simple, a simple process may be performed by dividing this document by using new paragraphs and extracting an area containing a predetermined keyword.

Next, a reply example candidate generation step 105 is executed for each important part. This step calculates the degree representative of whether the extracted important part has the question content corresponding to each reply example, and selects X reply example candidates in the higher order of this degree. The value X can be set freely by a user. In this case, if the selected reply example has a fill-in part, information of the fill-in part is searched from a fill-in database by using as a search key a questioner ID or the like added to the question document to generate a reply example with the filled-in part which is used as the reply example candidate.

First, a reply example candidate likelihood value is calculated for each important part, and X reply example candidates are selected in the higher order of the reply example candidate likelihood value. A method of calculating the reply example candidate likelihood value is the same as the method used at the important area combination step 104.

Since the reply example candidate is generated by using only the important parts and omitting the part not relevant to the question content, a reply example candidate generation precision can be raised even if there are a plurality of question contents. According to conventional techniques, a question document is divided by using only the information of this document so that the reply example cannot deal with some divided areas in some cases. As in this embodiment, when a plurality of important parts are extracted from a document, the important parts are collected and extracted in such a manner that each important part matches the reply example prepared beforehand. It is therefore possible to extract the important parts matching the prepared reply examples and raise the reply example candidate generation precision for each question content.

Figure 13:
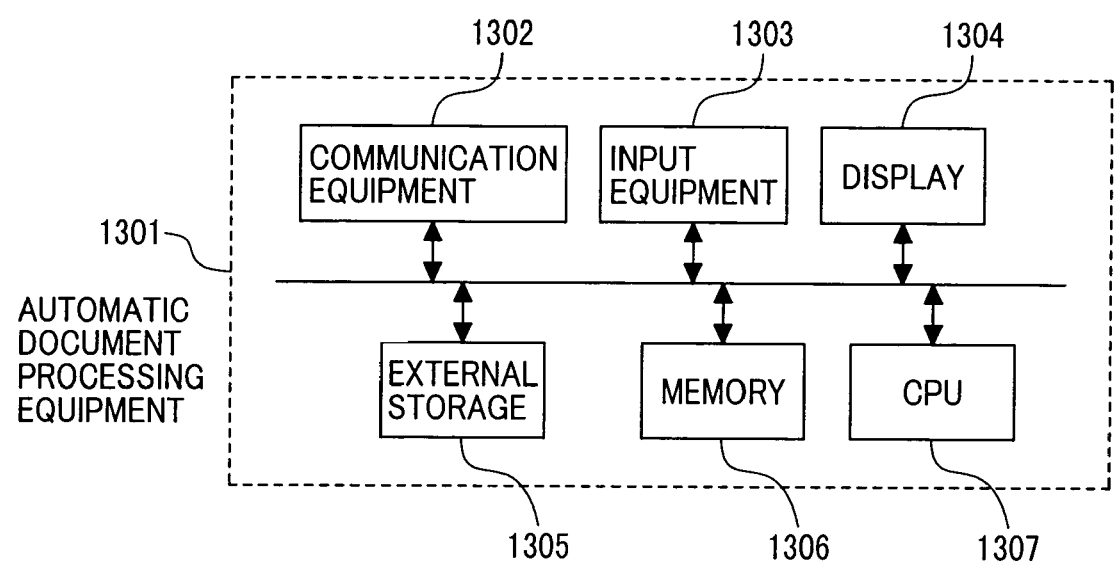
FIG. 13 is a diagram showing the structure of an equipment.

A series of these processes (101 to 105, 401 and 402) is executed by a document automatic processing equipment 1301 such as shown in FIG. 13. The document automatic processing equipment can be realized, for example by a computer, a server or the like combined to a network. A program for executing the series of processes is stored in a storage such as an external storage 1305 and a memory 1306, and executed by a CPU (Central Processing Unit) 1307. The document input step 101 can be realized by storing the information of a question document in the external storage or memory via a communication equipment 1302 and an input equipment 1303 such as a keyboard and an OCR equipment, under the control of CPU. The reply example keyword frequency information, important part keyword frequency information, unimportant part keyword frequency information, reply examples, fill-in database, threshold value information, intermediate data during a program execution are stored in the storage such as the external storage and memory, and then loaded/stored in CPU in accordance with the series of processes shown in FIG. 1. The results of the series of processes are stored in the storage such as the external storage and memory, and displayed on a display 1304 such as a liquid crystal display and a CRT. The results are also output to an external via the communication equipment 1302 and displayed on a display of another equipment combined via a communication line.

As the series of processes is executed by the document automatic processing equipment, a plurality of important parts for each question content and reply example candidates for each question content are selected.

Figure 15:
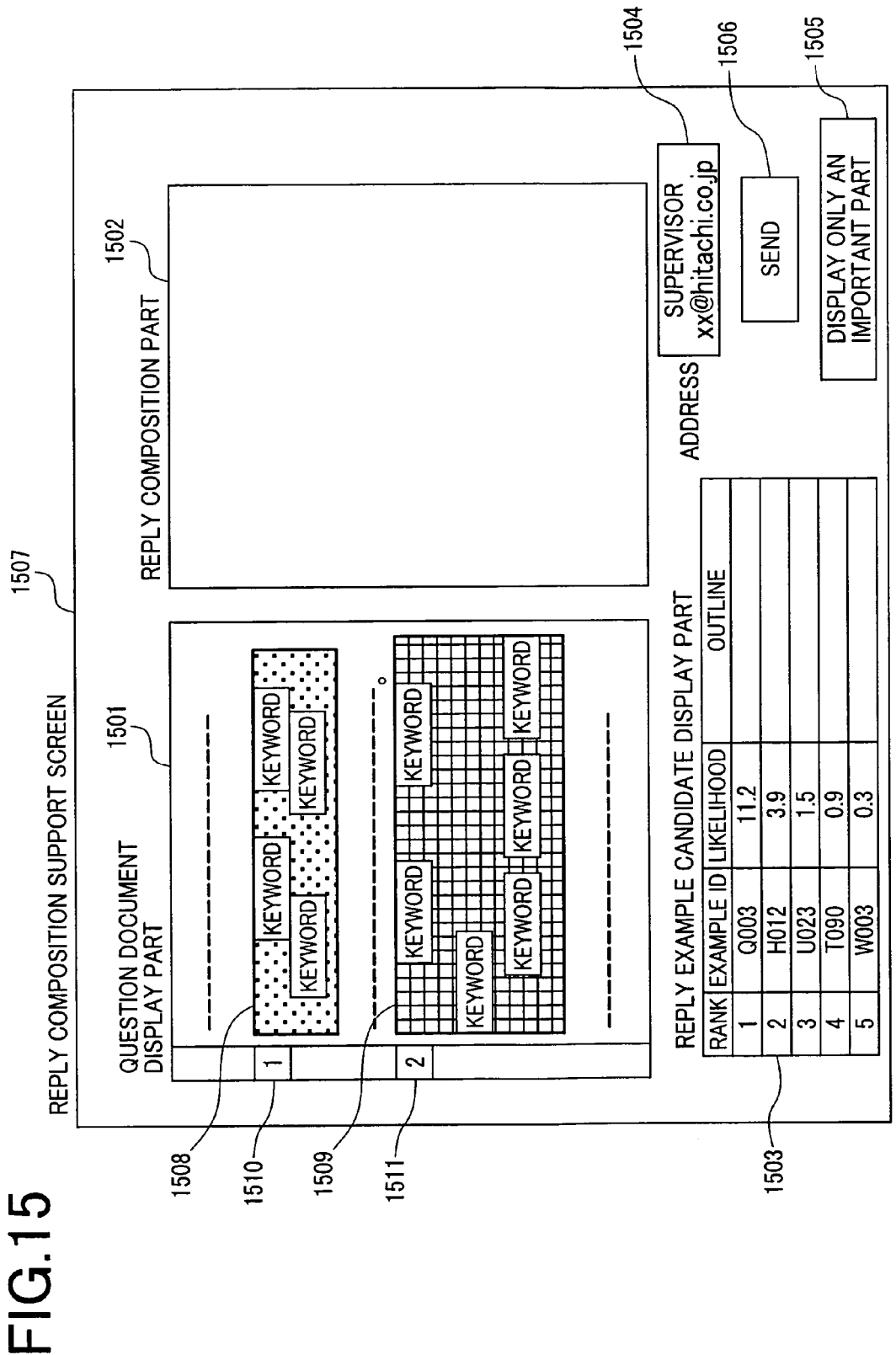
FIG. 15 is a diagram showing a reply composition support screen.

The selected important parts and their reply example candidates are presented to a user by using a display. When a question-answering apparatus transfers the reply example composition results and displays them on a terminal of a reply composition operator or the like, the question-answering apparatus transmits to the terminal a question document, and important part information (information on the location of an important part, corresponding reply example candidates and the like). In addition to these pieces of information, order information and likelihood information of a plurality of reply example candidates for each important part, information of the location of a keyword in each important part, and other information may also be transmitted. These pieces of information is presented to a reply composition operator at the question-answering apparatus or a display of the terminal. The reply composition operator composes reply examples by using the received information, and transmits the composition results to a supervisor terminal or directly returns the composition results to a questioner. With reference to FIG. 15, description will be made on a reply composition screen at a reply composition operator, i.e., a display screen for important parts and their reply example candidates. A reply composition support screen 1507 is constituted of a question/consultation document display part 1501, a reply composition part 1502, a reply example candidate display part 1503, an address display/edit part 1504, a send button 1506 and an only important part display button 1505.

A document of a text format from a questioner is displayed in the question/consultation display part 1501. In this case, extracted important parts 1508 and 1509 are displayed emphatically, for example, by giving a background color different from other parts. IDs 1510 and 1511 are assigned to the important parts and displayed on the sides of the important parts. Each important part is emphatically displayed by using a different background color or a different frame. Even a consultation document contains a plurality of important parts, these parts can be displayed in a distinguished manner. It is also easy to view the whole document. It is also easy to read sentences near an important part and to compose a reply example even if there is some displacement of an extracted important part. Even if an important part cannot be extracted, a reply composition work can be performed. Since a plurality of important parts can be viewed at a glance, it is advantageous in that the relation between a plurality of important parts can be easily grasped by a reply example creator. For example, even if a plurality of important parts are extracted although only one important part should be extracted, this error can be easily grasped and corrected. Since preceding and succeeding important parts can be read at a time, a reply creator can easily select proper reply examples by considering the document context. These advantageous effects can be obtained.

The terminal used by an operator is provided with an input equipment such as a mouse and a keyboard. By using a mouse, the operator can select each display object on the display screen and can change display contents and a display method. By using a keyboard, the operator can perform edition such as composition and addition of a reply example.

Figure 16:
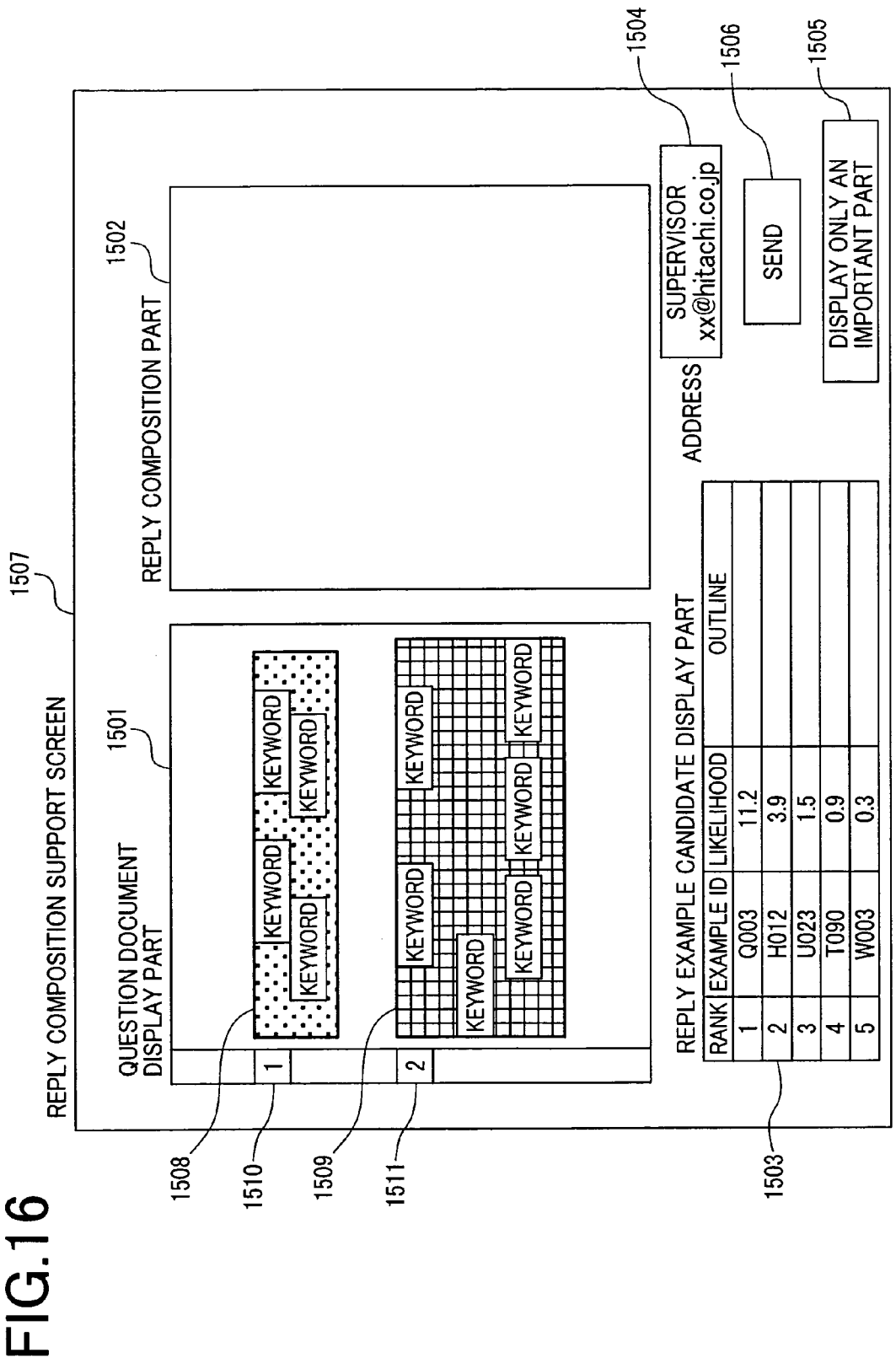
FIG. 16 is a diagram showing a reply composition support screen displaying only important parts.

When the only important part display button 1505 is depressed (is selected by using a mouse or the like), only important parts are displayed in the question/consultation document display part 1501 (refer to FIG. 16). When this button is again depressed, the initial image is displayed.

Since a reply composition operator can judge at once the positions of a plurality of question contents and can efficiently refer to each important part, the work efficiency can be improved.

A plurality of character strings are set beforehand as keywords for each reply example. The keywords of the first rank reply example candidates are emphatically displayed for each important area in the question/consultation document display part 1501 by using a different character color from that of other character strings.

The order, reply example IDs, likelihood and explanation of the five upper rank reply example candidates are displayed in the reply example candidate display part 1503. The order display part functions not only as a display part but also as a button. The reply example candidates for the uppermost important part are initially displayed among the important parts of the question document displayed in the question/consultation document display part 1501. Each important part in the question/consultation document display part 1501 is selected by clicking it, and the reply example candidates for the selected important part are displayed in the reply example candidate display part. In this case, the selected important part is emphatically displayed by using a background color different from that of other important parts. When any one of the order buttons is depressed, the reply example corresponding to the depressed order is displayed in the reply composition part 1502. At the same time, the color of the keywords emphatically displayed by a different color changes to the same color as that of other character strings, and the keywords set for the reply example corresponding to the depressed order are emphatically displayed by a color different from that of other character strings.

When any one of the reply example candidates is selected in the reply example candidate display part, the selected reply example candidate is displayed in the reply composition part. In this case, the newly selected reply example candidate may be displayed together with a reply example candidate having been displayed in the reply composition part before the reply example candidate is newly selected, or may be replaced with the already displayed reply example candidate. When an item corresponding to the reply example candidate now displayed in the reply composition part is selected in the reply example candidate display part, this reply example candidate may be deleted from the reply composition part.

By using these functions, a reply example composition operator composes a reply in the reply composition part. The reply ID in the reply example candidate display part is selected by using a mouse or the like, and a reply example candidate inserted into the reply composition part 1502 is used to compose a reply. In this case, not only the inserted reply example candidate may be used as a reply, but also the reply example candidate may be edited by using the input equipment such as a mouse and a keyboard, a new reply may be composed for the question content unable to be covered by the reply example candidate, or the composed part may be corrected/deleted. In this manner, replies to a plurality of questions can be edited in the reply composition part.

When replies to a plurality of questions are composed, an address is set in the address display/edit part 1504 and the send button 1506 is depressed to transmit the composed replies or answers to the destination address.

As described above, a reply example composition operator can efficiently browse the characteristic character strings corresponding to reply example candidates for a plurality of extracted important areas, and can select and combine proper reply example candidates to compose replies. An answering work can therefore be made efficient.

Second Embodiment

Figure 14:
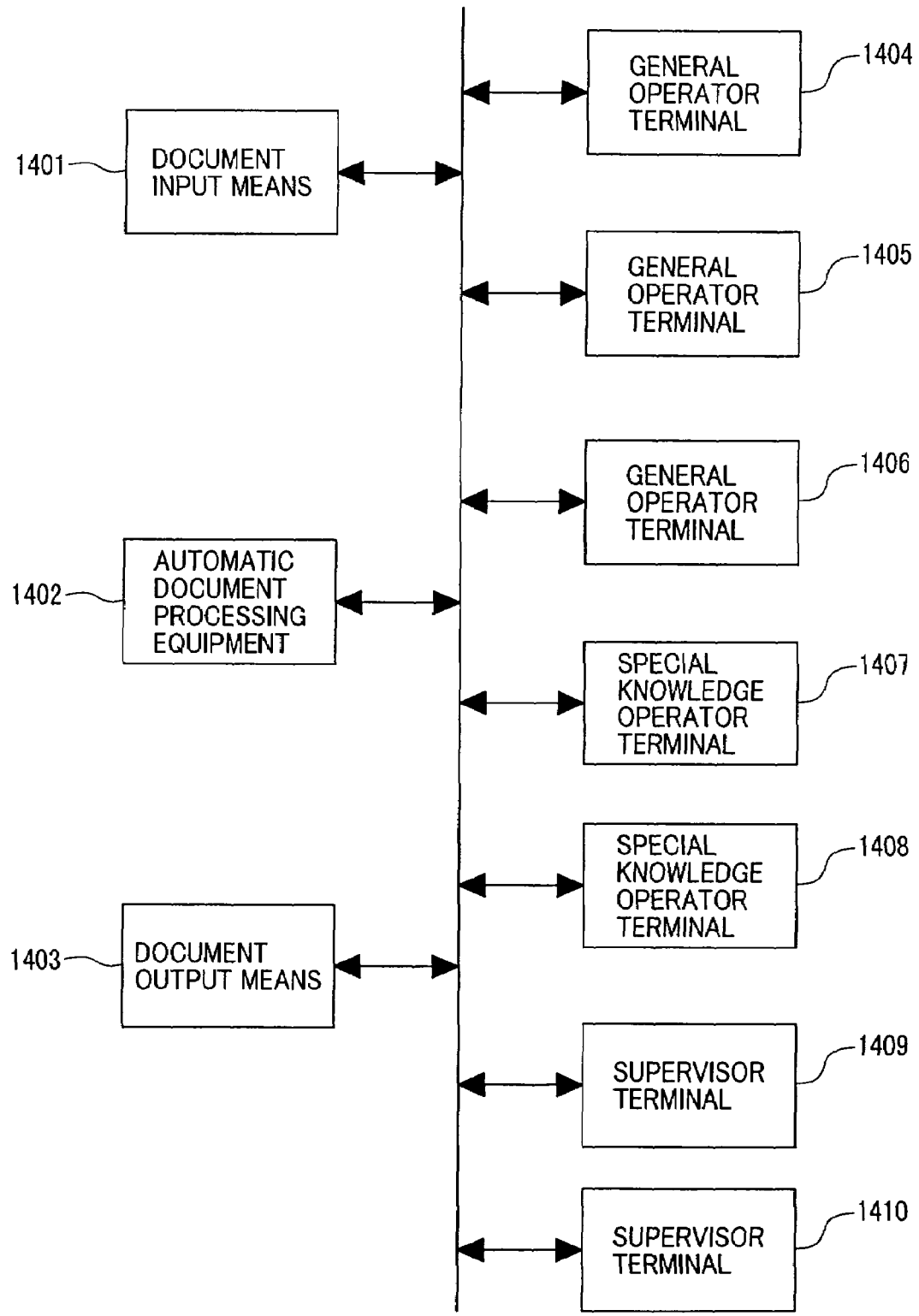
FIG. 14 is a diagram showing the structure of a document automatic distribution system.

Description will be made on the structure of the first embodiment added with the function of automatically distributing a reply example to an operator. FIG. 14 is a diagram showing the system configuration added with the automatic distribution function. This system has a document input means 1401, a document automatic processing equipment 1402, a document output means 1403, general operator terminals 1404, 1405 and 1406, special knowledge operator terminals 1407 and 1408 and supervisor terminals 1409 and 1410, respectively combined via a network. The number of each means and each terminal is not limited to one, but a plurality of means and terminals may be used.

The document input means is an equipment having means for inputting a question document, such as a mail server for receiving an e-mail and an OCR equipment for changing a paper document to text data. The document input means and document automatic processing equipment may be one integrated equipment.

Figure 20:
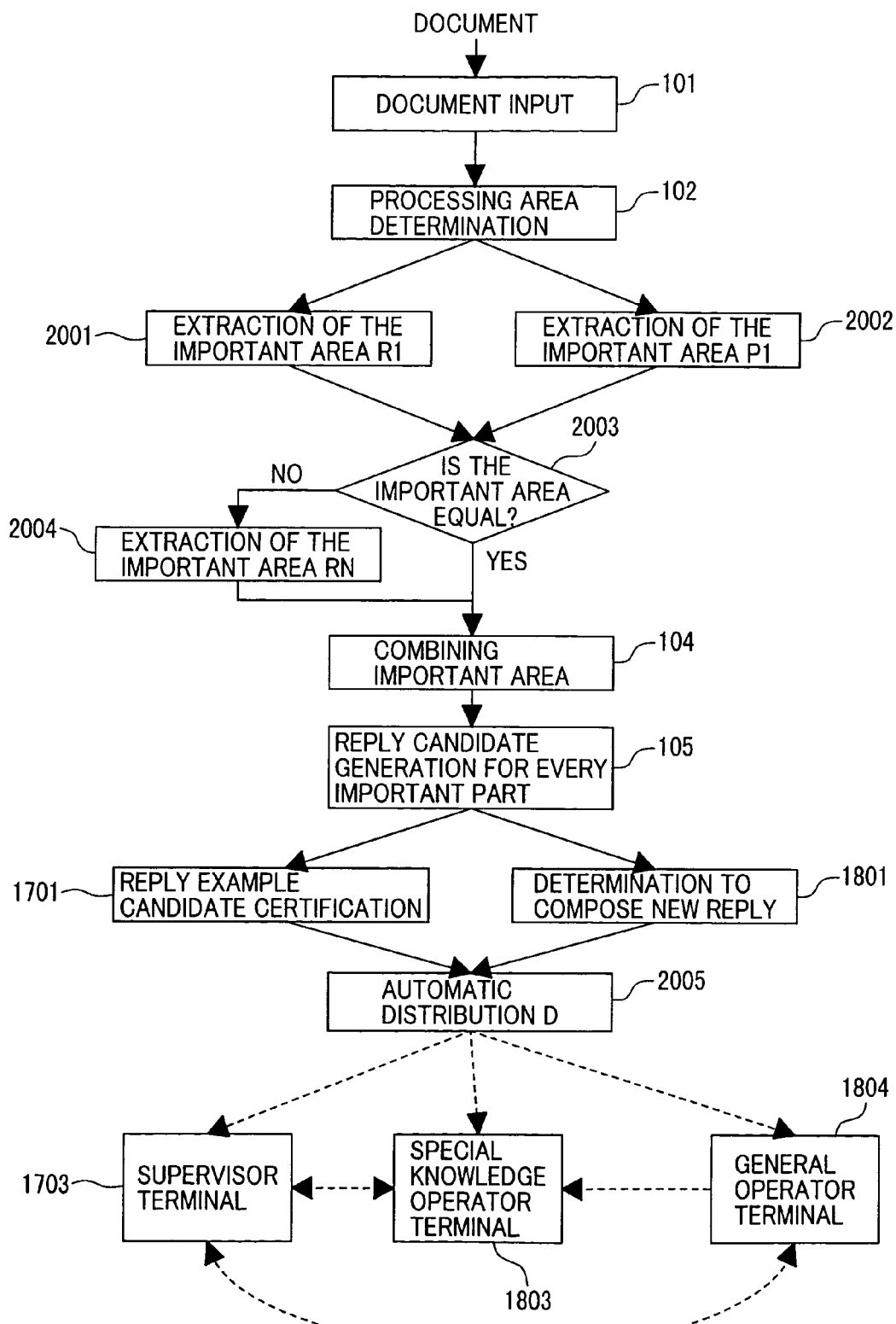
FIG. 20 is a diagram illustrating automatic distribution using three types of important area extraction.

The document automatic processing equipment is a computer or a server combined to a network as shown in FIG. 13. The document automatic processing equipment receives a document from the document input means and performs a document process (automatic distribution process) such as selecting reply example candidates for each of a plurality of questions as shown in FIG. 20. The automatic distribution process result and question document are sent to one of the general operator terminals, special knowledge operator terminals and supervisor terminals, in accordance with the automatic distribution process result.

The general operator terminal receives a question document and an automatic distribution process result sent from the document automatic processing equipment or supervisor terminal, and the operator performs a reply composition work. This work result is sent to the terminal selected by the operator from the supervisor terminals, special knowledge terminals and other general operator terminals. Mainly the question document capable of being processed only by the reply example candidates is sent to the general operator terminal so that the operator can select a proper reply example and compose a reply. If the question unable to be processed by the reply example candidates is received, the question document and automatic distribution process result are sent to the special knowledge operator terminal.

The special knowledge operator terminal receives a question document and an automatic distribution process result sent from the document automatic processing equipment, another special knowledge operator terminal, the supervisor terminal, or the general operator terminal, and the operator performs a reply composition work. This work result is sent to the terminal selected by the operator from the supervisor terminals, general operator terminals and other special knowledge terminals. In many cases, mainly the question document unable to be processed only by the reply example candidates is sent to the special knowledge operator terminal so that the operator can compose a new reply. The operator composing a new reply is desired to have special knowledge capable of answering the new question content.

The supervisor terminal receives a question document and an automatic distribution process result sent from the document automatic processing equipment, the special knowledge operator terminal, another supervisor terminal, or the general operator terminal, and the supervisor performs confirmation, correction or the like of a reply composition result. If it is confirmed that the composed reply is correct, the reply is sent to the document output means, whereas if the composed reply is not correct, the question document and automatic distribution process result as well as an instruction of composing again a reply are sent to the general operator terminal or special knowledge terminal.

The document output means is an equipment provided with means for outputting a reply, such as a mail server for transmitting an e-mail and a printer for printing a reply. A reply is sent via this equipment to a questioner. The document output means and document automatic processing equipment may be one integrated equipment.

Figure 19:
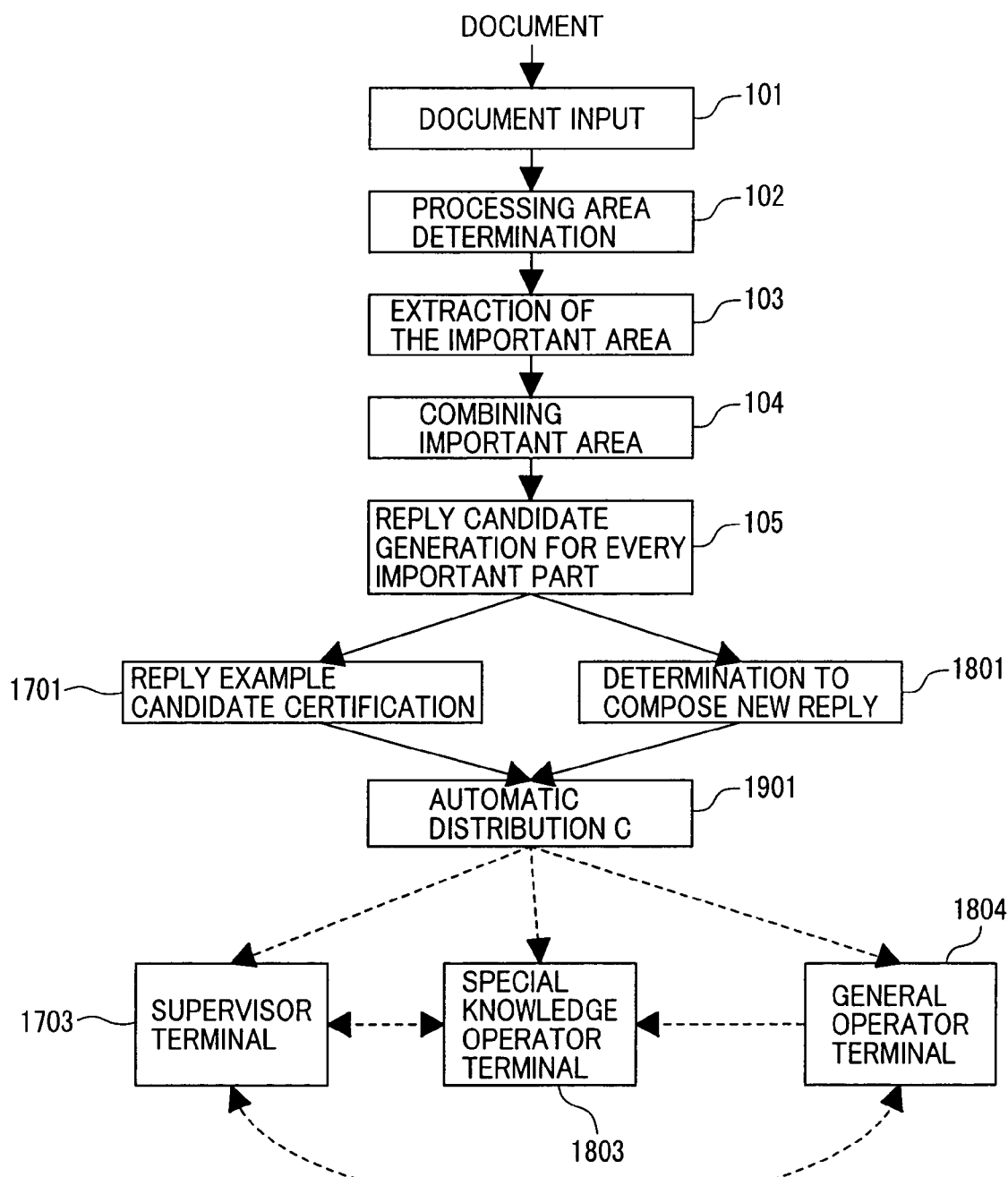
FIG. 19 is a diagram illustrating automatic distribution with the reply example candidate certification and reply new composition distinction.

Next, with reference to FIG. 19, description will be made on the process to be executed by the document automatic processing equipment. The previously described five steps are first executed, including the document input step, processing area determination step, important area extraction step, important area combination and reply example composition step for each important part.

Next, a reply example candidate certification step 1701 is executed. It is certified at this step whether the first rank reply example candidate selected for each important part is correct or not. First, a reply example candidate reliability degree is calculated which indicates the degree representative of whether the reply example candidate is correct. As the reply example candidate reliability degree, the reply example candidate likelihood value of the first rank reply example candidate is used (the reply example candidate likelihood value calculated when a reply example candidate is generated for each important part). Instead, another value may be used if it indicates the degree representative of whether the reply example candidate is correct. For example, as described in "Information Retrieval Algorithm" by kenji KITA, Kazuhiko TSUDA and Masanori SHISHIBORI, KYORITSU SHUPPAN Co. Ltd, the IDF calculation may be used to calculate the reply example candidate reliability degree. The reply example candidate reliability degree for each important part is compared with a predetermined threshold value. If the reply example candidate reliability degree is larger than the threshold value, it is judged that the first rank reply example candidate is correct, whereas if the reply example candidate reliability degree is equal to or smaller than the threshold value, it is judged that the first rank reply example candidate is unsure. The threshold value is set based upon the experiment results of calculation of reply example candidate reliability degrees from question document samples, in such a manner that the reply example candidate reliability degree larger than the threshold value is often obtained if the first rank reply example candidate for each important part is correct.

Instead of this method, whether or not the reply example candidate is correct may be judged in the following manner. A plurality of keywords are set for each reply example, and if some keywords corresponding to the first rank reply example candidate are contained in the important part, it is judged that the first rank reply example candidate is correct, whereas in the other cases, it is judged that the first rank reply example candidate is unsure.

Next, a reply new composition distinction step 1801 is executed. It is judged at this step whether a new reply is required to be composed because the reply example candidate cannot deal with the important part. First, a reply new composition degree is calculated which indicates the degree representative of whether it is necessary to compose a new reply for each important part. As the reply new composition degree, the likelihood value of the first rank reply example candidate is used. Instead, another value may be used if it indicates the degree representative of whether it is necessary to compose a new reply for each important part. For example, as described in "Information Retrieval Algorithm" by kenji KITA, Kazuhiko TSUDA and Masanori SHISHIBORI, KYORITSU SHUPPAN Co. Ltd, the IDF calculation may be used to calculate a new reply example candidate reliability degree.

The reply new composition degree for each important part is compared with a predetermined threshold value. If the reply new composition degree is smaller than the threshold value, it is judged that it is necessary to compose a new reply, whereas if the reply new composition degree is equal to or larger than the threshold value, it is judged that it is unclear whether it is necessary to compose a new reply.

The threshold value is set based upon the experiment results of calculation of reply new composition degrees from question document samples, in such a manner that the reply new composition degree smaller than the threshold value is often obtained if it is necessary to compose a new reply for the important part.

Next, an automatic distribution step C 1901 is executed. At this step, the following processes are performed. Namely, the document, whose first rank reply example candidates for all important parts are certified as correct at the reply example candidate certification step 1701, and a series of process results obtained up to this stage are sent to the supervisor terminal. The document having even one important part for which the reply new composition distinction step 1801 judges that it is necessary to compose a new reply, and the series of process results obtained up to this stage are sent to the specific knowledge operator terminal 1803. The document other than the above-described two documents is sent to the general operator terminal 1804.

In a rare case although it seldom occurs, the specific knowledge terminal receives the document, whose first rank reply example candidates for all important parts are certified as correct at the reply example candidate certification step 1701, and which has even one important part for which the reply new composition distinction step 1801 judges that it is necessary to compose a new reply. By using the reply composition support screen such as shown in FIG. 15, at the general operator terminal the operator selects a proper reply example from the reply example candidates for each important part by operating the keyboard or mouse to compose a reply. The reply composed by the operator is sent to the supervisor terminal. The document having the important part with which the reply example candidates cannot deal is sent to the specific knowledge terminal. In determining a distribution destination, an evaluation value representative of the certainty of a composed reply may be used instead of the reply example candidate reliability degree and reply new composition degree.

By using the reply composition support screen such as shown in FIG. 15, at the specific knowledge terminal the operator selects a proper reply example from the reply example candidates for each important part for the part the reply example candidates can deal with, and composes a new reply for the part the reply example candidates cannot deal with, respectively by operating the keyboard or mouse to compose a reply. The composed reply is sent to the supervisor terminal from the operator.

By using the reply composition support screen such as shown in FIG. 15, at the supervisor terminal the supervisor confirms whether the reply for each important part is correct. If all the replies are confirmed to be correct, the replies are sent to the questioner. If there is an incorrect reply, the supervisor corrects it or the question document is again sent to the specific knowledge operator terminal or general operator terminal.

In this embodiment, although both the reply example candidate certification and reply new composition are performed to automatically distribute the question document and automatic distribution process results to the supervisor terminal, specific knowledge operator terminal or general operator terminal, the following two configurations may be adopted.

Figure 17:
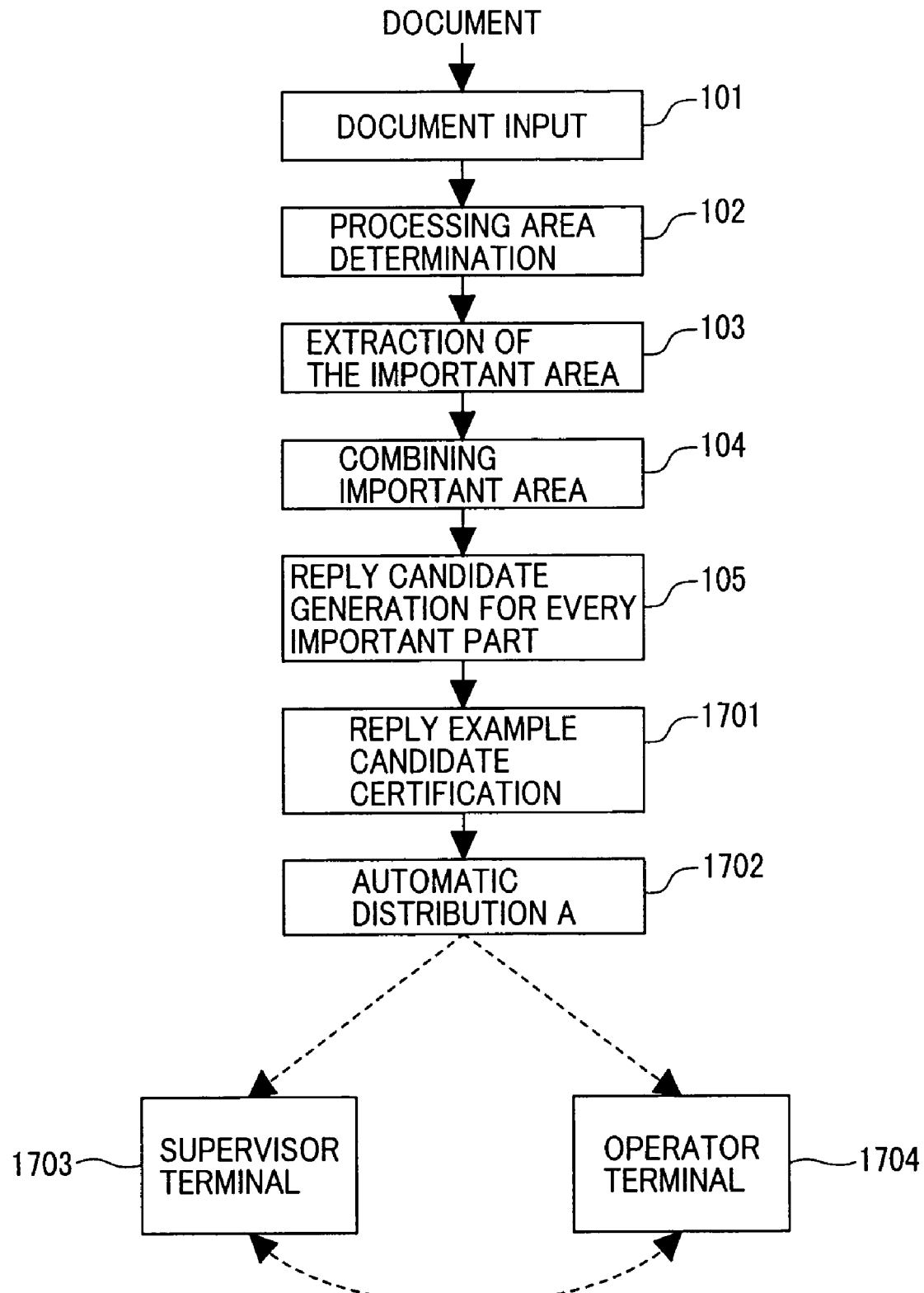
FIG. 17 is a diagram illustrating automatic distribution with reply example candidate certification.

As shown in FIG. 17, in one configuration, only the reply example composition certification may be performed. At an automatic distribution step A 1702, the document, whose first rank reply example candidates for all important parts are certified as correct, and a series of process results obtained up to this stage are sent to the supervisor terminal, and the document other than the above-described document is sent to an operator terminal 1704.

Figure 18:
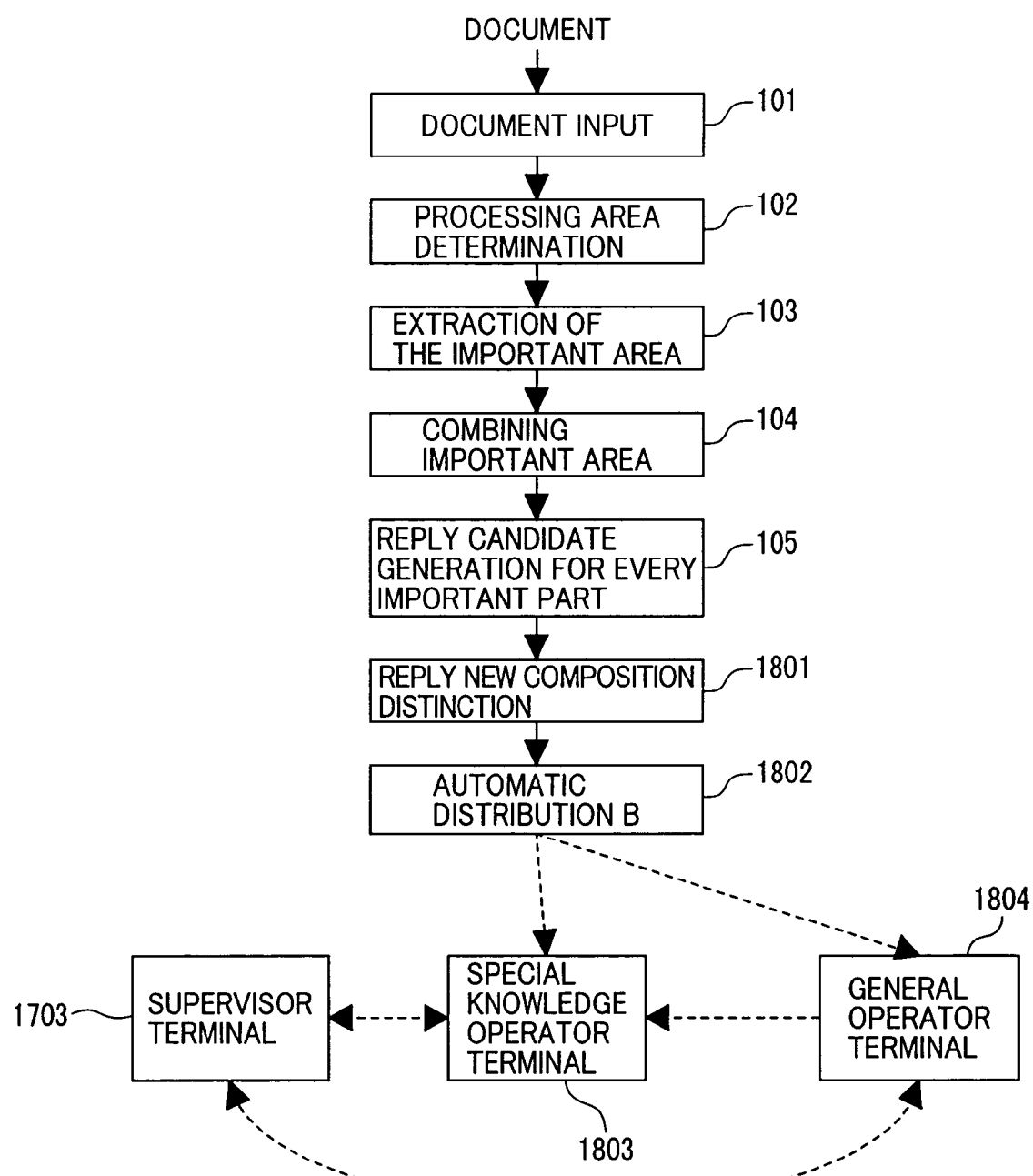
FIG. 18 is a diagram illustrating automatic distribution with reply new composition distinction.

As shown in FIG. 18, in the other configuration, only the reply new composition distinction step may be performed. At an automatic distribution step B 1802, the document having even one important part required to compose a new reply, and the series of process results obtained up to this stage are sent to the specific knowledge operator terminal 1803, and the document other than the above-described document is sent to the general operator terminal 1804.

The reply example candidate certification step 1701, reply new composition distinction step 1801, automatic distribution step A 1702, automatic distribution step B 1802., automatic distribution step C 1901 and automatic distribution step D 2005 are the steps added to perform the automatic distribution process. A program for realizing these steps is stored in a storage such as the external storage 1304 and memory 1305 and executed by CPU. Information of the threshold values used for the reply example candidate certification and reply new composition is stored in the storage such as the external storage 1304 and memory 1305 and loaded/stored by CPU in accordance with series of processes shown in FIG. 18, FIG. 19 and FIG. 20.

Conventionally, a reply selection work or a reply new composition work has been required to be performed for each important part of all documents. In this embodiment, however, a document sent directly to the supervisor terminal is subjected to only the confirmation work for reply example candidates so that the work can be made efficient. Since the number of operators is reduced, the cost can be lowered. A general operator performs a reply composition work for the question document for which a reply example candidate is merely selected, and a specific knowledge operator performs a reply composition work for the question document for which a new reply is required to be composed, so that the work can be made efficient. The number of specific knowledge operators receiving generally high wages can be reduced so that the cost can be lowered.

The process to be performed when the automatic distribution function is added has been described above. This system configuration may be changed to the system without supervisor terminals wherein a reply to be sent to a supervisor is directly sent to the questioner.

The configuration shown in FIG. 20 may be adopted by changing the structure of an important area extraction process in the automatic distribution process.

In the important area extraction process, an important area R1 extraction step 2001 and an important area P1 extraction step 2002 are executed. At the step 2001, all important areas which may contain errors are extracted. At the step 2002, although not all important areas can be extracted, all correct important areas are extracted. At a step 2003 it is checked whether the important area R1 extraction result is the same as the important area P1 extraction result. Only if the results are different, the important area R1 result and the important area P1 result are deleted and an important area RN extraction step 2004 is executed.

Figure 3:
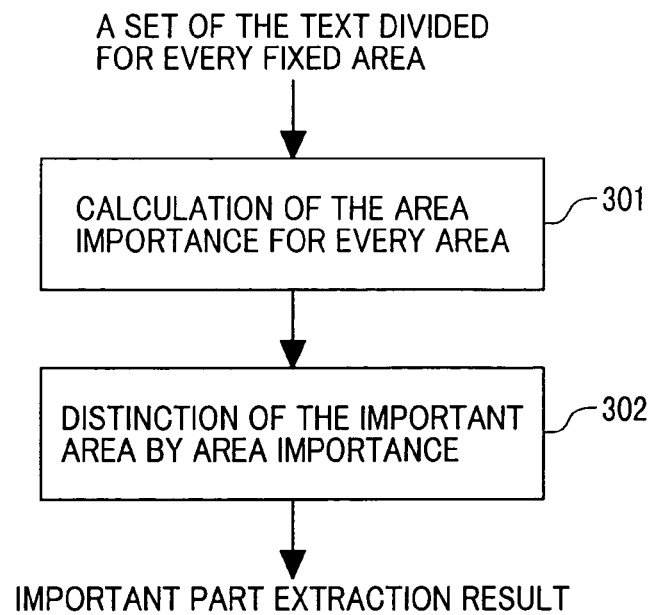
FIG. 3 is a diagram illustrating an important area extraction process utilizing an area importance degree.
Figure 4:
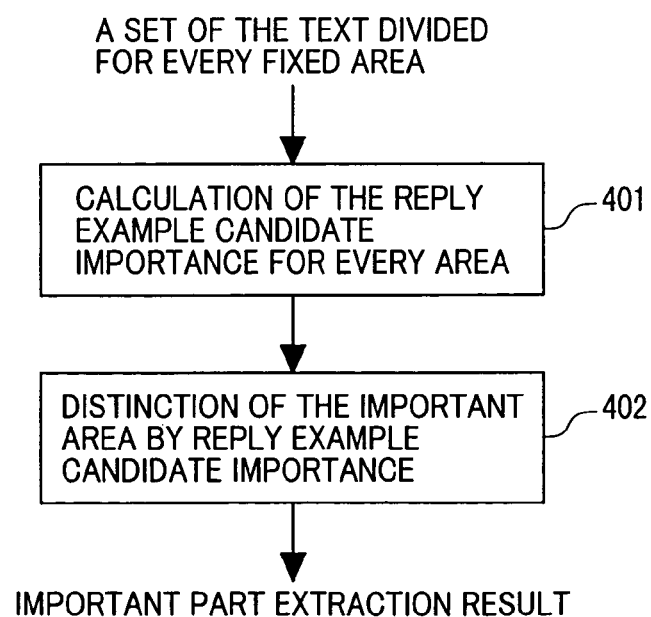
FIG. 4 is a diagram illustrating an important area extraction process utilizing the reply example candidate likelihood value and area importance degree.

The step 2001 for R1, in which all important areas which may contain errors are extracted, uses the important area extraction method (FIGS. 2 to 4) described with the first embodiment. The threshold value used when extracting the important part is set to such a low value that all important parts can be extracted.

The step 2002 for P1, in which although not all important areas can be extracted, all correct important areas are extracted, uses the important area extraction method (FIGS. 2 to 4) described with the first embodiment. The threshold value used when extracting the important part is set to such a high value that all unimportant parts are not extracted.

The important area RN extraction step uses the important area extraction method (FIGS. 2 to 4) described with the first embodiment. The threshold value used when extracting the important part is set to such a value having a small extraction rate for unimportant areas and extracting many important areas.

Next, an important area combination step 104 is executed. Next, a reply candidate generation step 105 is executed for each important part. Next, a reply example candidate certification step 1701 is executed. Next, a reply new composition distinction step 1801 is executed. Then, an automatic distribution step D 2005 is executed.

Only if the important area R1 extraction result is the same as the important area P1 extraction result, the document, whose first rank reply example candidates for all important parts are judged to be correct by the reply example candidate certification, is sent to the supervisor terminal, whereas the document, having even one important part for which it is judged by the new reply composition distinction that a new reply is to be composed, is sent to the specific knowledge operator terminal. In other cases the document is sent to a general operator terminal.

With this configuration, although the number of documents distributed to the supervisor terminal and specific knowledge terminal is reduced, the important area extraction result of a question document has a small leak and the extraction result of all important areas has a small error, so that the automatic distribution with a small error can be realized.

It should be further understood by those skilled in the art that although the foregoing description has been made on embodiments of the invention, the invention is not limited thereto and various changes and modifications may be made without departing from the spirit of the invention and the scope of the appended claims.

The representative inventions of the present application other than the above-described invention are given in the following.

A program for a question-answering apparatus having an input unit for receiving an input of a question document, a storage unit for storing a plurality of reply examples and question document keyword frequency information of a keyword contained in the question documents corresponding to the reply examples, and a CPU for selecting a reply example for an important area of the question document from the plurality of question examples, the program executing steps of: dividing the input question document into a plurality of areas; calculating a likelihood value of each of the plurality of areas, the likelihood being representative of whether each area contains a question content corresponding to each of the plurality of stored reply examples; and extracting the important area in accordance with a relation between a predetermined threshold value and the likelihood value of any one of the areas.

A program for a question-answering apparatus having an input unit for receiving an input of a question document, a storage unit for storing a plurality of reply examples, important part keyword frequency information indicating an occurrence frequency of a keyword in important parts of each question document and unimportant part keyword frequency information indicating an occurrence frequency of a keywords in unimportant parts of each question document, and a CPU for selecting a reply example for an important area of the question document from the plurality of question examples, the program executing steps of: dividing the input question document into a plurality of areas; calculating an importance degree of each of the plurality of areas, by using the important part keyword frequency information and the unimportant part keyword frequency information; and extracting as the important area the area having the calculated importance degree in excess of a predetermined threshold value.

A question-answering system comprising: an input unit for receiving an input of a question document, important part information of a plurality of important parts extracted from the question document and reply example candidate information of a reply example candidate for each of the plurality of important parts; an information processing unit, a display unit for displaying a reply document for the question document; and a user input unit for receiving an user input regarding the displayed reply example candidate, wherein the display unit displays the question document in a first emphatic manner emphasizing a plurality of important parts identified by the important part information, and a reply document containing the reply example candidates indicated by the reply example candidate information.

What is claimed is:

1. A method implemented by a program being executable by a processor for a question-answering apparatus having communication equipment, a storage for storing a plurality of reply examples and a CPU for performing a reply composition process of replying to the question document by using a reply example selected from the plurality of reply examples, the method comprising the steps of:
   receiving an input of a question document into said communication equipment;
   storing in said storage important part keyword frequency information of a keyword of a reply example having an important part, and unimportant part keyword frequency information of a keyword of a reply example having an unimportant part;
   dividing said input question document into a plurality of areas;
   extracting a plurality of areas from said input question document;
   obtaining a likelihood value of a question content corresponding to each of said plurality of stored reply examples for each of said plurality of areas, by using said reply example keyword frequency information;
   combining said plurality of areas to provide one or a plurality of important parts in accordance with said likelihood value of said plurality of reply examples obtained for each of said plurality of areas;
   calculating an importance degree of each of said plurality of areas by using said important part keyword frequency information;
   extracting as an important area an area having said calculated importance degree larger than a predetermined threshold value to obtain a reply example candidate corresponding to said important part by using the plurality of stored reply examples.

2. The method according to claim 1 wherein:
   said important area extracting step outputs a first extraction result using a first threshold value and a second extraction result using a second threshold value smaller than said first threshold value;

said important part combining step and said reply example candidate obtaining step for said important part are performed for said first and second extraction results;

similarity is judged between a reply example candidate obtained for said first extraction result and a reply example candidate obtained for said second extraction result; and the program further executes a distribution step of determining, as an output destination of a process result of said reply example candidate obtaining step for said important part, either a first reply composition terminal or a second reply composition terminal respectively combined via a communication line to said question-answering apparatus, in accordance with said similarity.

3. The method according to claim 1, further comprising:

a step of calculating a distribution destination evaluation value of a reply example candidate corresponding to said important part and comparing said distribution destination evaluation value with a predetermined threshold value; and a distribution step of determining, as an output destination of a process result of said reply example candidate obtaining step for said important part, one of a plurality of reply composition terminals respectively combined via a communication line to said question-answering apparatus, in accordance with a comparison result.

4. The method according to claim 1, further comprising steps of:

transmitting said question document, important part information identifying areas of said combined important parts and reply example candidate information obtained as a process result of said reply example candidate obtaining step for said important part, to a reply composition terminal combined via a communication line to said question-answering apparatus and having a display and an input unit;

displaying, on the display of said reply composition terminal, said question document with the areas of said important parts identified by said important part information in a first emphatic manner and a reply document containing reply example candidates identified by reply example candidate information;

receiving a selection input of one important part in said displayed document by using the input unit; and displaying said one important part selected by said selection input in a second emphatic manner or displaying a reply example candidate corresponding to said one important part in said reply document in a third emphatic manner.

5. The method according to claim 4 wherein:

said transmitting step transmits a plurality of reply example candidates corresponding to said respective important part in a higher order of the reply example candidate likelihood value; and in response to the selection input of selecting said one important part, the program executes a step of displaying a plurality of reply example candidates corresponding to said one important part in an area different from said reply document.

6. The method according to claim 5 further comprising steps of:

receiving at the input unit said selection input of selecting one of said plurality of reply example candidates; and in response to said reply example candidate selection input, displaying said selected reply example candidate in said reply document.

7. The method according to claim 4 wherein a predetermined character string in said displayed important parts is emphatically displayed.

8. The method according to claim 4 each of said important parts is emphatically displayed in a different manner.

9. The method according to claim 4 wherein ID information of each of said important parts is displayed together with each of said important parts.

10. A question-answering system having a question-answering apparatus and a reply composition terminal combined via a network to said question-answering apparatus, wherein:

said question-answering apparatus comprises a communication equipment for receiving an input of a question document, a storage for storing a plurality of reply examples and a processor unit for performing a reply composition process of replying to the question document by using a reply example selected from the plurality of reply examples;

said reply composition terminal comprises a communication apparatus for receiving a result of said reply composition process, a display for displaying information contained in said reply composition process result and an input unit for receiving an input for said display information;

said storage stores important part keyword frequency information of a keyword of a reply example having an important part, and unimportant part keyword frequency information of a keyword of a reply example having an unimportant part;

the processor unit divides said input question document into a plurality of areas;

the processor unit of said question-answering apparatus extracts a plurality of areas from said input question document, obtains a likelihood value of a question content corresponding to each of said plurality of stored reply examples for each of said plurality of areas, by using said reply example keyword frequency information, combines said plurality of areas to provide one or a plurality of important parts in accordance with said likelihood value of said plurality of reply examples obtained for each of said plurality of areas, calculates an importance degree of each of said plurality of areas by using said important part keyword frequency information or said unimportant part keyword frequency information, extracts as an important area an area having said calculated importance degree larger than a predetermined threshold value to obtain a reply example candidate corresponding to said important part by using the plurality of stored reply examples to output said reply composition process result.

11. The question-answering system according to claim 10 wherein:

said important area extraction outputs a first extraction result using a first threshold value and a second extraction result using a second threshold value smaller than said first threshold value;

said important part combining process and said reply example candidate obtaining process for said important part are performed for said first and second extraction results;

similarity is judged between a reply example candidate obtained for said first extraction result and a reply example candidate obtained for said second extraction result; and a distribution destination of a process result of said reply example candidate obtaining process for said important part is determined either as a first reply composition terminal or as a second reply composition terminal respectively combined via a communication line to said question-answering apparatus, in accordance with said similarity.

12. The question-answering system according to claim 10, wherein:

a plurality type of reply composition terminals are provided;

the processor unit of said question-answering apparatus calculates a distribution destination evaluation value of a reply example candidate corresponding to said important part and compares said distribution destination evaluation value with a predetermined threshold value; and an output destination of a process result of said reply example candidate obtaining process for said important part is determined as one of a plurality of reply composition terminals respectively combined via a communication line to said question-answering apparatus, in accordance with a comparison result.

13. The question-answering system according to claim 10, wherein:

said question-answering apparatus transmits said question document, important part information identifying areas of said combined important parts and reply example candidate information obtained as a result of said reply example candidate obtaining process for said important part, to said reply composition terminal; and said reply composition terminal displays on the display, said question document with the areas of said important parts identified by said important part information in a first emphatic manner and a reply document containing reply example candidates identified by reply example candidate information.

14. The question-answering system according to claim 13, wherein:

said reply composition terminal receives a selection input of one important part in said displayed document by using the input unit; and the display displays said one important part selected by said selection input in a second emphatic manner or displays a reply example candidate corresponding to said one important part in said reply document in a third emphatic manner.

15. The question-answering system according to claim 14 wherein:

said question-answering apparatus transmits a plurality of reply example candidates corresponding to said respective important part in a higher order of the reply example candidate likelihood value; and said display displays a plurality of reply example candidates corresponding to said one important part in an area different from said reply document, in response to the selection input of selecting said one important part, and in response to said selection input of selecting one of said plurality of reply example candidates via said input unit, displays said selected reply example candidate in said reply document by replacing said reply example candidate displayed with said reply document with said selected reply example candidate.

16. The question-answering system according to claim 13 wherein information of each of said important parts is displayed together with each of said important parts.

* * * * *